(12) United States Patent
Kobayashi

(10) Patent No.: US 6,827,473 B2
(45) Date of Patent: Dec. 7, 2004

(54) PROJECTION-TYPE HEADLAMP ALSO HAVING INFRARED LIGHT EMITTING FUNCTION

(75) Inventor: Shoji Kobayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/271,999

(22) Filed: Oct. 17, 2002

(65) Prior Publication Data

US 2003/0076688 A1 Apr. 24, 2003

(30) Foreign Application Priority Data

Oct. 18, 2001 (JP) ...................................... P.2001-320111

(51) Int. Cl.[7] .............................................. F21V 11/00
(52) U.S. Cl. ......................... 362/510; 362/293; 362/539
(58) Field of Search ................................ 362/510, 538,
362/539, 293, 512, 513, 280, 305; 250/495.1;
313/110, 112, 117

(56) References Cited

U.S. PATENT DOCUMENTS

| | | | | |
|---|---|---|---|---|
| 4,967,319 A | * | 10/1990 | Seko ........................... | 362/466 |
| 5,067,054 A | * | 11/1991 | Oshio et al. ................. | 362/510 |
| 5,130,904 A | * | 7/1992 | Ohshio et al. ............... | 362/516 |
| 5,285,358 A | * | 2/1994 | Watanabe et al. ........... | 362/538 |
| 5,961,206 A | * | 10/1999 | Eichler ........................ | 362/307 |
| 6,467,940 B2 | * | 10/2002 | Eschler et al. ............... | 362/510 |
| 2001/0019482 A1 | | 9/2001 | Kobayashi et al. | |

FOREIGN PATENT DOCUMENTS

| | | | | |
|---|---|---|---|---|
| EP | 0794382 | * | 5/1996 | ............ F21M/3/14 |
| JP | 2001-60403 | | 3/2001 | |

* cited by examiner

Primary Examiner—Alan Cariaso
Assistant Examiner—Mark Tsidulko
(74) Attorney, Agent, or Firm—Sughrue Mion, PLLC

(57) ABSTRACT

A projection-type headlamp serving also as an infrared light-emitting lamp assuring a sufficient intensity of infrared light irradiation ahead of a vehicle while preventing glare to oncoming vehicles in the adjacent lane. The headlamp is provided with an ellipsoidal reflector, a light source, a shade in the form of an infrared light-transmitting film for reflecting visible light and while allowing infrared light to pass through, and a projection lens for forming simultaneously a predetermined visible light beam pattern and a predetermined infrared light beam pattern, in which an upper edge portion of the shade is positioned above the optical axis of the reflector. A cut line and a hot zone of the visible light beam pattern are set beneath the horizontal line on a light distribution screen so that the visible light beam cannot cause glare for drivers of oncoming vehicles in the opposite lane, and a hot zone of the infrared light beam pattern is set on the horizontal line on the light distribution screen. With this arrangement, the infrared light beam reaches a long distance, and the imaging performance of an infrared noctovision camera is enhanced

20 Claims, 9 Drawing Sheets

PROJECTION-TYPE HEADLAMP ALSO HAVING INFRARED LIGHT EMITTING FUNCTION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a projection-type vehicular headlamp which also serves as an infrared light-emitting lamp used with a CCD camera having a sensitivity covering the near-infrared range. More particularly, the invention relates to a projection-type headlamp serving also as an infrared light-emitting lamp which is capable of forming simultaneously a visible light beam pattern having a cut line corresponding to the upper edge of a shade and a predetermined infrared light beam pattern by using the shade for reflecting visible light components while the infrared light component passes through the shade.

A conventional lamp of this general type is disclosed, for example, in Japanese Laid-Open Patent Application No. 2001-60403. As shown in FIGS. 14 and 15, in this projection-type headlamp serving also as an infrared light-emitting lamp an ellipsoidal reflector 3 and a projection lens 4 are disposed in a lamp chamber defined by a lamp body 1 and a front cover 2. A light source 5 is mounted at a first focal point f1 of the reflector 3, and a visible light shielding shade 6 is disposed near a second focal point f2 of the reflector 3. The light shielding shade 6 is made of a material which cuts visible light and passes infrared light, and thus, as shown in FIG. 16, the headlamp provides both a low-beam pattern Ps having a clear-cut line corresponding to an upper edge portion 6a of the light shielding shade 6 and a horizontally elongated ellipsoidal infrared light beam pattern Pa including the low beam pattern Ps.

This lamp functions as a low beam headlamp, for instance, when driving in an urban district or like, and also functions as an infrared light-emitting lamp used in an infrared "noctovision" system including an infrared light camera, display device, etc. That is, an infrared light irradiation area (the region illuminated by the beam pattern Pa) ahead of the vehicle is sensed by a CCD camera having a sensitivity including the near-infrared range and which is disposed in a forward portion on the vehicle, the output of the camera is processed by an image processing device, and the resulting image is displayed on a monitor screen in the vehicle. The driver thus can recognize pedestrians, lane markers, obstacles and the like on the monitor screen.

In particular, with regard to the function of the headlamp as an infrared light-emitting lamp, since the ellipsoidal infrared light beam pattern Pa overlaps the low beam pattern Ps, a sufficient infrared light intensity for operating the infrared light camera is obtained, and it is easy to recognize images displayed on the monitor.

In such conventional projection-type headlamp serving also as an infrared light-emitting lamp where, as shown in FIG. 14, the shade upper edge portion 6a and a light source 5 mounted on a reflector 3 are aligned on the optical axis L of a projection lens 4, a "hot zone" PsH of the low beam pattern Ps is formed near the intersection of a horizontal line H and a vertical line V on a light distribution screen. Accordingly, although the forward visibility for the driver provided by this headlamp is excellent, some glare may be caused for drivers of oncoming vehicles in the adjacent lane, creating a safety problem.

As shown in FIG. 16, the problem of glare can be solved to some degree by aiming the headlamp in such a manner that the clear-cut line of the low beam pattern Ps is beneath the line H. However, such an approach also causes the hot zone of the infrared light beam pattern Pa to fall beneath the line H, thereby making the infrared light intensity at more remote distances insufficient for proper operation of the infrared camera and thus lowering the visibility at remote distances on the monitor screen.

BRIEF SUMMARY OF THE INVENTION

The present invention has been made in consideration of the problems of the prior art described above, and it is hence an object of the invention to provide a projection-type headlamp serving also as an infrared light-emitting lamp which is capable of providing sufficient infrared light intensity ahead of the vehicle while preventing the visible light from causing glare to drivers of oncoming vehicles in the adjacent lane.

To achieve the object described above, a projection-type headlamp according to the invention serving also as an infrared light-emitting lamp is provided with an ellipsoidal reflector, a light source disposed at a first focal point of the reflector, a projection lens disposed ahead of the reflector, and a shade disposed near a second focal point of the reflector for shielding visible light while letting infrared light pass therethrough for thus forming simultaneously a visible light beam pattern having a cut line and an infrared light beam pattern, wherein the upper edge portion of the shade is positioned above the optical axis of the reflector.

The shade may be formed, for example, of an infrared light transmitting film disposed and fixed on a transparent glass plate at a specific position so as to form an infrared light-transmitting filter.

Since the upper edge portion of the shade is positioned above the optical axis of the reflector, the cut line and hot zone of the visible light beam pattern are located beneath the horizontal line H on the light distribution screen, and hence the visible light beam does not cause glare for vehicles in the adjacent lane. Moreover, since the hot zone of the infrared light beam pattern, which is not influenced by the shade, falls on the horizontal line H on the light distribution screen, the infrared light beam reaches a long distance, and the imaging performance of the infrared light noctovision camera is enhanced.

The upper edge portion of the shade may be formed in a convex shape, curved upward.

If the upper edge portion of the shade is straight in the lateral direction, the cut line of the visible light beam pattern on the light distribution screen is formed in a convex shape, curving downward, due to aberration effects of the lens, thereby reducing visibility. However, since, in accordance with the invention, the upper edge portion of the shade is formed in a convex shape curved upward, the cut line of the visible light beam pattern is substantially straight in the lateral direction, even taking into account the aberration effects of the projection lens, so that visibility is enhanced.

Also, a second shade for shielding visible light may be disposed above the shade.

In such a case, an infrared light CCD camera and a visible light CCD camera are installed as infrared noctovision cameras, and the images sensed by the two cameras are composed and displayed on the monitor. The visible light CCD camera has an automatic gain control function for adjusting the gain automatically to an optimum value so that the image output is not too high or too low by measuring the luminance of the viewing field ahead of the camera and adjusting the gain of the photodetector of the camera depending on the luminance or adjusting the aperture of an automatic iris of the camera (hereinafter referred to collectively as adjustment of the gain of the photodetector or the like of the camera). However, this automatic gain control function tends to reduce the gain of the photodetector or the like of the camera excessively due to the strong effects of light intensity (brightness) in the illuminated area near the vehicle where the solid angle is large. Therefore, the imaging performance is reduced in remote areas where the solid angle is small and the image of the remote area displayed on the monitor may be unclear. Accordingly, by partially shielding the portion of the visible light emitted to regions near the vehicle with the second shade, the visible light intensity in the illuminated area near the vehicle which could have adverse effects on the automatic gain control function is reduced, hence alleviating the excessively strong automatic gain control function of the visible light CCD camera and thereby improving the imaging performance in remote areas where the solid angle is small. On the other hand, since the infrared light is not shielded by the second shade and the infrared light intensity in the infrared light illuminated area is not reduced, the imaging performance of the infrared light CCD camera is not adversely affected. Therefore, when the images of the visible light CCD camera and infrared light noctovision CCD camera are composed, the monitor displays an image of the view ahead of the vehicle excellent in visibility in remote areas.

Still further in accordance with the invention, the visible light transmission efficiency may be adjusted to be larger closer to the edge portion side.

A specific structure for increasing the visible light transmission efficiency in the upper edge portion of the shade more at the edge portion side includes a structure whose thickness gradually changes in the upper edge portion of the shade, a structure of increasing density toward the edge of fine through-holes formed along the upper edge portion of the shade, and a structure of fine undulations continuously formed in the upper edge portion of the shade.

In the projection type headlamp of the invention, if the illumination contrast near the cut line of the visible light beam is excessive (i.e., the contrast of the cut line border is too sharp), the visibility tends to be reduced, but since the visible light transmission efficiency in the shade upper edge portion gradually changes in the vertical direction, the brightness contrast near the cut line of the visible light beam is lessened, that is, the sharpness of brightness contrast is reduced, so that the visibility is improved.

It is preferable that the visible light transmission efficiency at the lower edge portion of the second shade is designed to avoid reducing visibility due to sharp stripes of high contrast illuminated on the road surface, that is, it is preferred that the brightness of the illuminated pattern changes gradually, similarly to the visible light transmission efficiency in the upper edge portion of the shade forming the cut line.

DETAILED DESCRIPTION OF THE INVENTION

Preferred embodiments of the present invention will now be described referring to the attached drawings.

Figure 1:
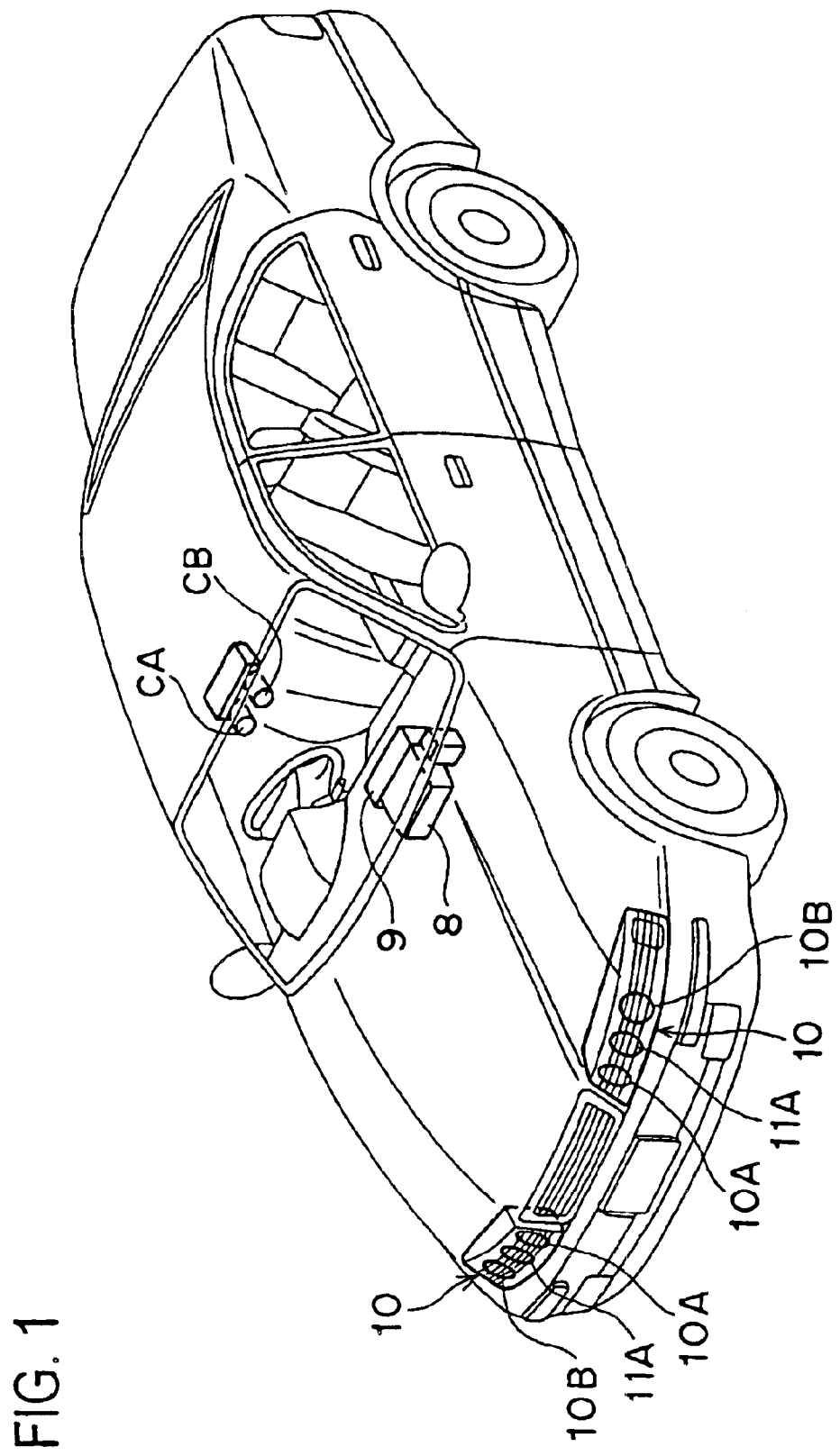
FIG. 1 is a general view of a vehicle having a nighttime forward-view detecting system using a projection-type headlamp serving also as an infrared light-emitting lamp constructed in accordance with a first embodiment of the present invention.
Figure 2:
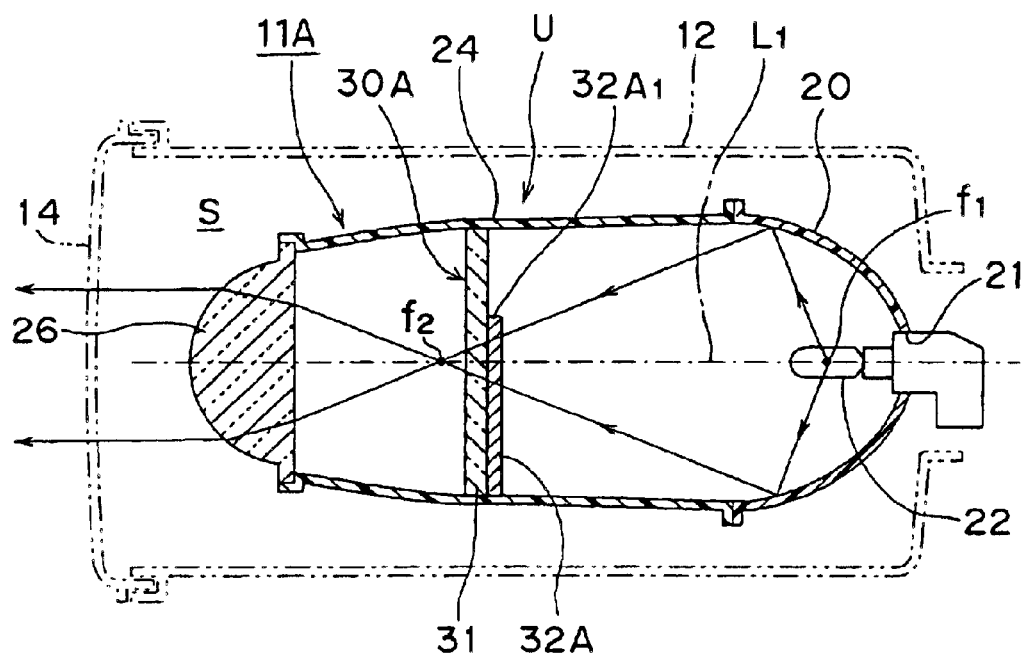
FIG. 2 is a longitudinal sectional view of the projection-type headlamp serving also as an infrared light-emitting lamp of FIG. 1.
Figure 3:
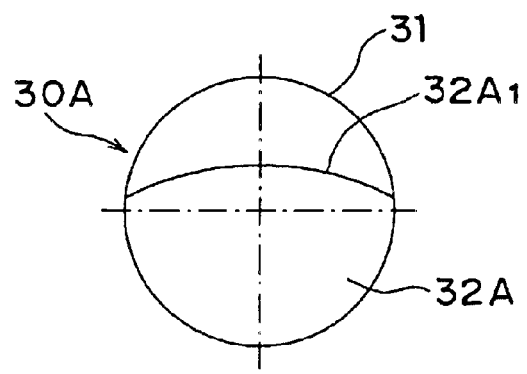
FIG. 3 is a rear view of an infrared light-transmitting filter used in a shade constituting a principal component of the headlamp of FIG. 1.
Figure 4:
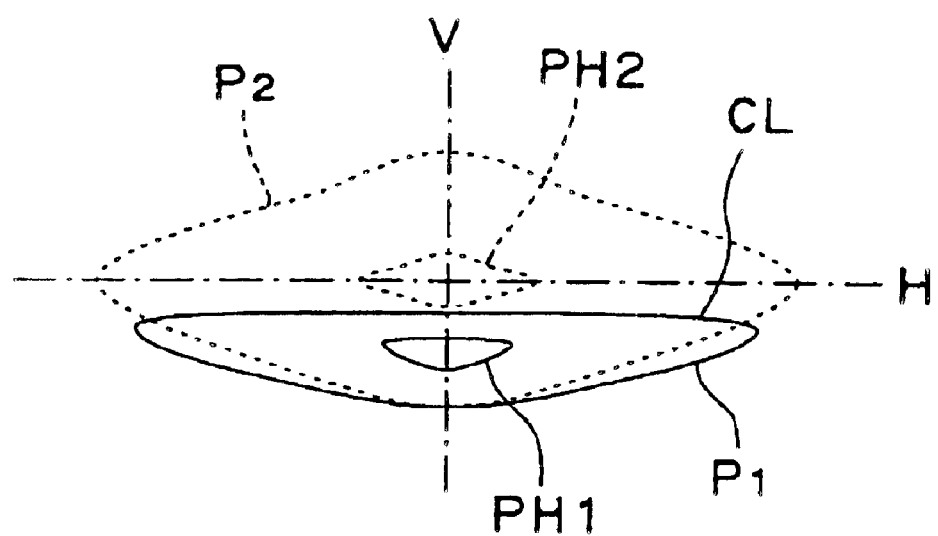
FIG. 4 shows a light distribution pattern of the headlamp of FIG. 1.

FIG. 1 to FIG. 4 show an embodiment where the present invention is applied to a nighttime forward view detecting system, in which FIG. 1 is an overall view of a nighttime forward view detecting system using a projection-type headlamp serving also as an infrared light-emitting lamp in accordance with a first embodiment of the present invention, FIG. 2 is a longitudinal sectional view of the projection-type headlamp of FIG. 1, FIG. 3 is a rear view of an infrared light-transmitting filter forming a principal component of a shade of the headlamp, and FIG. 4 is a diagram showing a light distribution pattern of the headlamp.

The nighttime forward view detecting system is provided with, as shown in FIG. 1, a projection lamp unit 11A serving also as an infrared light-emitting lamp integrally formed in a headlamp 10 mounted at a forward position on a vehicle, CCD cameras CA and CB disposed, for example, in the upper portion in the vehicle's passenger compartment for sensing the view ahead of the vehicle for visible and infrared light, respectively, an image processing and analyzing device 8 for analyzing the images sensed by the CCD cameras CA and CB, and a heads-up display (HUD) 9 for displaying the image data analyzed by the image processing and analyzing device 8.

The CCD camera for sensing the image ahead of the vehicle is provided with a visible light CCD camera CA having sensitivity in the visible light range, and an infrared light CCD camera CB having sensitivity in a range up to and including infrared light. The CCD cameras are arranged in a stereo camera system capable of measuring the distance to an object in the forward area. The images sensed by the two CCD cameras CA and CB are sent to the image processing and analyzing device 8 where the two images are processed and compared.

That is, the video output voltage of each scanning line (field) is extracted from the video image sensed by the CCD camera and stored as display data for the entire screen (or as a main part thereof), after correcting for the gamma characteristics (photoelectric conversion characteristics) of both cameras CA and CB. This correction is necessary for adjusting the sensitivity of both cameras CA and CB and for obtaining nearly same video outputs by both cameras CA and CB for a given object on the road. The difference is calculated from the two images and differences larger than a certain threshold is extracted from the image, whereby an image of otherwise invisible pedestrians, obstacles or lane markers at a long distance from the vehicle is obtained. By edge processing or pattern recognition of the image of the difference in a known manner, pedestrians, obstacles or lane markers can be easily recognized.

The system is designed such that an image of pedestrians, obstacles, lane markers, etc., can be presented to the driver on the heads-up display (HUD) 9, or noticed to the driver in the form of an audio alarm, for instance, by judging certain features of the object (pedestrian, obstacle or lane marker) by recognizing the shape.

The headlamp 10 is constructed as shown in FIGS. 1 and 2. More specifically, a lamp chamber S is formed by assembling a front cover 14 over the front opening of a lamp body 12 made of synthetic resin. The lamp chamber S accommodates a lamp unit 10A for forming a driving beam, a lamp unit 10B for forming a low beam, and a projection-type lamp unit 11A functioning as fog lamp and serving also as an infrared light-emitting lamp. The lamp units 10A, 10B, and 11A are designed and constructed so as to be tiltably adjustable about their optical axes in vertical and horizontal directions by an aiming mechanism (not shown in the drawing).

The projection-type lamp unit 11A has an integrated structure incorporating a projection lens 26 mounted on a cylindrically shaped metal lens holder 24 forward of a metal ellipsoidal reflector 20 upon which is mounted a light source. The light source is preferably a halogen bulb 22 whose light-emitting portion is positioned at the first focal point f1 of the ellipsoidal reflector 20. An infrared light-transmitting filter 30A incorporating a light shielding shade for light distribution control is disposed at the focal point of the projection lens 26 near the second focal point f2 of the reflector 20. Light emitted by the bulb 22 is reflected by the reflector 20, as indicated by an arrow in FIG. 2, then passes through the second focal point f2, and is formed into a light flux centered about to the optical axis L by the projection lens 26. The resulting light flux is distributed forwardly, thereby forming a visible light beam pattern P1 (see FIG. 4) whose pattern is controlled by the light shielding shade. Reference numeral 21 denotes a bulb insertion hole.

That is, the infrared light-transmitting filter 30A has an infrared light transmitting film 32A, which blocks visible light components while permitting infrared light components to pass, formed as an integral structure with a circular transparent glass plate 31. Accordingly, as shown in FIG. 4, the exit light from the projection lens 26 forms a visible light beam pattern P1 having a cut line CL corresponding to the upper edge portion 32A1 of the infrared light transmitting film on a light distribution screen disposed in front of the vehicle, and the infrared light transmitting film 32A, while acting as a light shielding shade, also lets the infrared light components pass through, forming a infrared light beam pattern P2 which overlaps the light beam pattern P1.

The visible light beam pattern P1, namely, the light distribution pattern of the fog lamp, functions as an auxiliary lamp of a lamp unit 10B for forming a low beam, that is, as a lamp the emission of visible light for operating the CCD camera CA, in collaboration with the lamp unit 10B forming the low beam. On the other hand, the invisible infrared light beam pattern P2, which provides illumination for the infrared light CCD camera CB, has the same irradiation area as a driving (high) beam pattern produced by the lamp unit 10A.

An upper edge portion 32A1 of the infrared light transmitting film 32A of the infrared light-transmitting filter 30A extends to a higher position than the optical axis L1 of the lamp unit 11A, and, as shown in FIG. 4, the cut line CL of the visible light beam pattern P1 is below the horizontal line H on the light distribution screen (the hot zone PH1 is about 1.0 degree lower than the horizontal line H on the vertical line V), while the hot zone PH2 of the infrared light beam pattern P2 is adjusted to be centered on the intersection of the vertical line V and the horizontal line H on the light distribution screen.

In this embodiment, therefore, the cut line CL of the visible light beam pattern P1 and hot zone PH1 are below the horizontal line H on the light distribution screen, and therefore the visible light beam does not cause glare for vehicles in the adjacent lane. Moreover, since the hot zone PH2 of the infrared light beam pattern P2 is aligned with the horizontal line H on the light distribution screen, the infrared light beam reaches a long distance and the imaging performance of the infrared light CCD camera CB is thus enhanced.

The upper edge portion 32A1 of the infrared light transmitting film 32A of the infrared light-transmitting filter 30A is formed in a convex shape, curved upward, as shown in FIG. 3, and the cut line CL of the visible light beam pattern P1 on the light distribution screen is substantially straight in the lateral direction. That is, when the upper edge portion 32A1 of the infrared light transmitting film in the infrared light-transmitting filter 30A is straight in the lateral direction, due to aberration effects of the projection lens 26, the cut line CL of the visible light beam pattern P1 on the light distribution screen droops downward at the right and left side, impairing lateral visibility. However, in this embodiment, since the upper edge portion 32A1 of the infrared light transmitting film is formed in an upwardly curved convex shape in consideration of aberration effects of the projection lens 26, the cut line CL of the visible beam pattern P1 on the light distribution screen is made to be substantially straight in the lateral direction due to the same aberration effects, as a result of which the lateral visibility of the visible light beam irradiation area is excellent.

Figure 5:
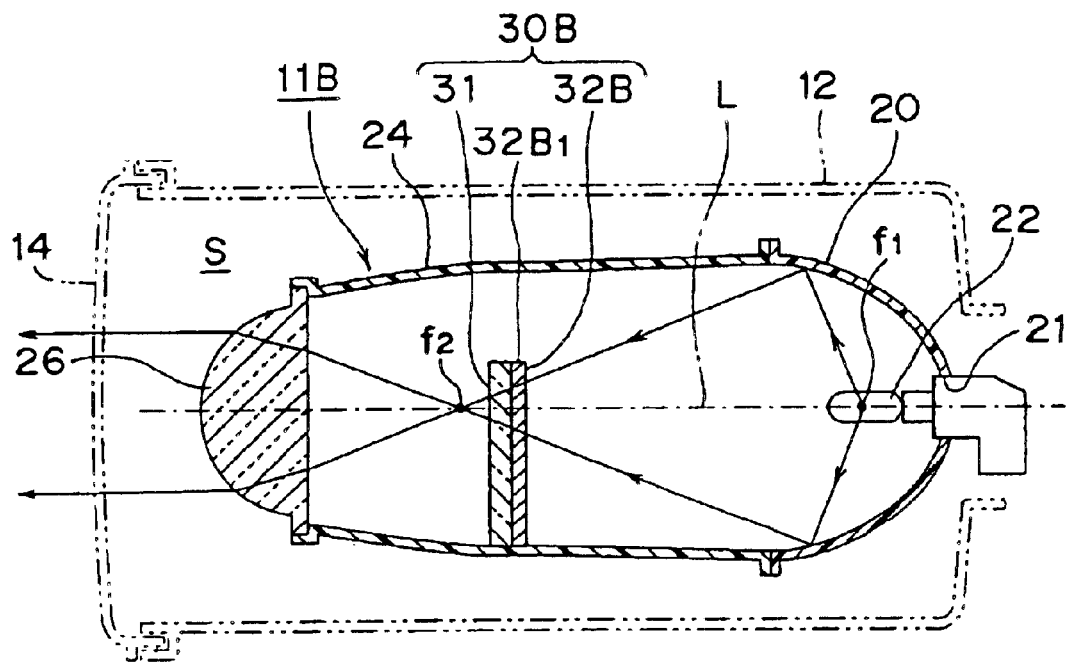
FIG. 5 is a longitudinal sectional view of a projection-type headlamp serving also as an infrared light-emitting lamp constructed in accordance with a second embodiment of the present invention.
Figure 6:
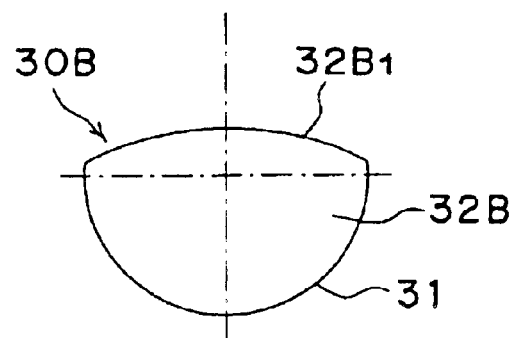
FIG. 6 is a rear view of an infrared light-transmitting filter used in a shade constituting a principal component of the headlamp of FIG. 5.

FIGS. 5 and 6 show a projection-type headlamp serving also as an infrared light-emitting lamp of a second embodiment of the present invention, FIG. 5 is a longitudinal sectional view of the headlamp, and FIG. 6 is a rear view of an infrared light-transmitting filter forming a principal component of the shade of the lamp.

In the projection lamp unit 11A serving also as an infrared light-emitting lamp of the first embodiment described above, the circular infrared light-transmitting filter 30A is disposed so as to divide the lens holder 24 into front and rear parts, and a clear translucent portion is provided substantially in an upper half of the infrared light-transmitting filter 30A. However, in the projection lamp unit 11B serving also as an infrared light-emitting lamp of the second embodiment, an infrared light transmitting film 32B acting as the shade main body is formed over the entire rear side of a transparent glass plate 31, a substantially semicircular infrared light-transmitting filter 30B is disposed inside the lens holder 24, and a translucent area is formed at the upper side of the infrared light-transmitting filter 30B. With this arrangement, since the lens holder 24 is not partitioned by the filter 30B, the build-up of heat within the lamp unit 11B is reduced.

Other elements and features are the same as in the first embodiment and are identified with the same reference numerals, and therefore a further description is omitted.

Figure 7:
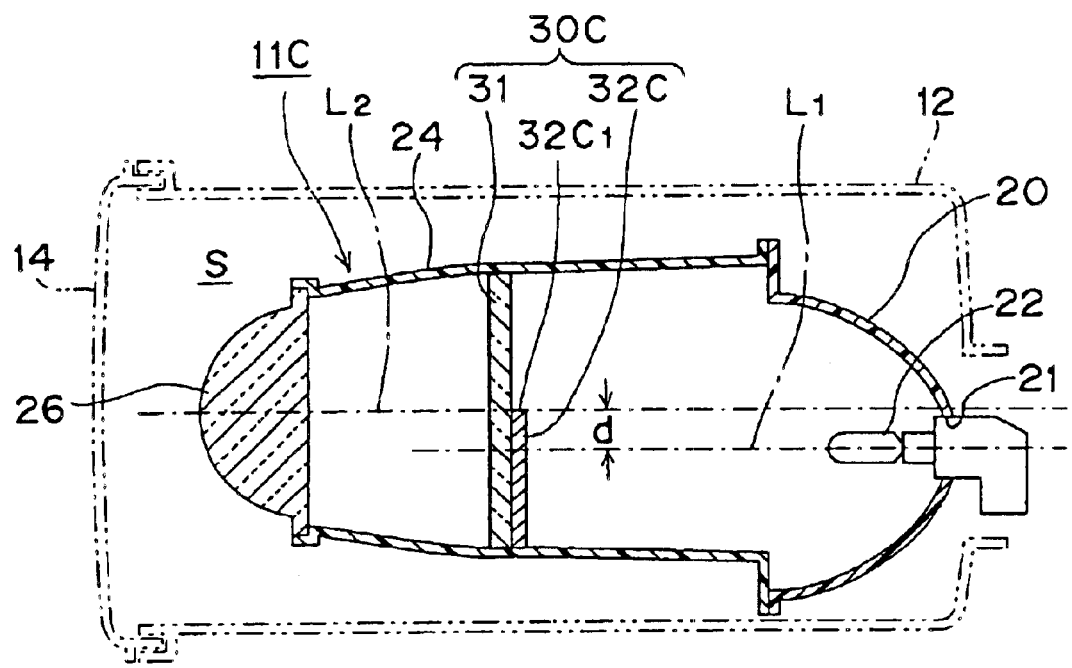
FIG. 7 is a longitudinal sectional view of a projection-type headlamp serving also as an infrared light-emitting lamp constructed in accordance with a third embodiment of the present invention.
Figure 8:
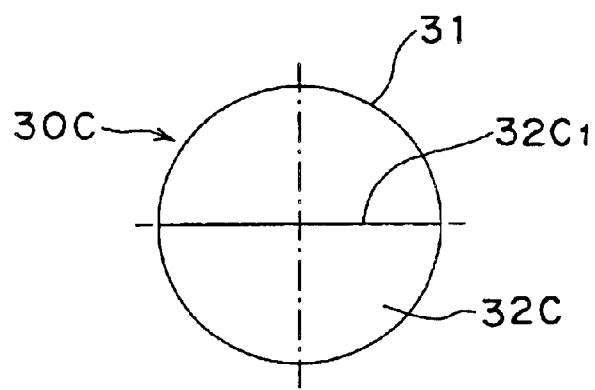
FIG. 8 is a rear view of an infrared light-transmitting filter used in a shade constituting a principal component of the headlamp of FIG. 7.

FIGS. 7 and 8 show a projection-type headlamp serving also as an infrared light-emitting lamp of a third embodiment of the present invention, FIG. 7 is a longitudinal sectional view of the headlamp, and FIG. 8 is a rear view of an infrared light-transmitting filter forming a principal component of the shade of the headlamp.

In the projection lamp unit 11C serving also as an infrared light-emitting lamp of the third embodiment, an upper edge portion 32C1 of an infrared light transmitting film 32C of a circular infrared light-transmitting filter 30C is formed linearly, extending laterally to intersect at a right angle with the optical axis L2 of a projection lens 26. The lens holder 24 and reflector 20 are assembled together so that the optical axis L1 of the reflector 20 is offset by a predetermined distance d beneath the optical axis L2 of the projection lens 26, coinciding with the upper edge portion 32C1 of the infrared light transmitting film 32C. The same as in the case of the first embodiment described above, the cut line CL of the visible light beam pattern P1 is located beneath the horizontal line H on the light distribution screen (the hot zone PH1 is beneath the horizontal line H and on the vertical line V), and the hot zone PH2 of the infrared light beam pattern P2 is adjusted to be aligned with the intersection of the vertical line V and the horizontal line H on the light distribution screen (see FIG. 4).

Therefore, in this embodiment too the light distribution pattern is formed as shown in FIG. 4, and the hot zone PH1 of the visible light beam pattern P1 is located beneath the horizontal line H on the light distribution screen, as a result of which the visible light beam does not cause glare for oncoming vehicles in the adjacent lane. The hot zone PH2 of the infrared light beam pattern P2 is on the horizontal line H on the light distribution screen so that the infrared light beam reaches a long distance, and hence the imaging performance of the infrared light CCD camera CB is enhanced.

Other elements and features are the same as in the first embodiment and are identified with the same reference numerals, and therefore a further description is omitted.

Figure 9:
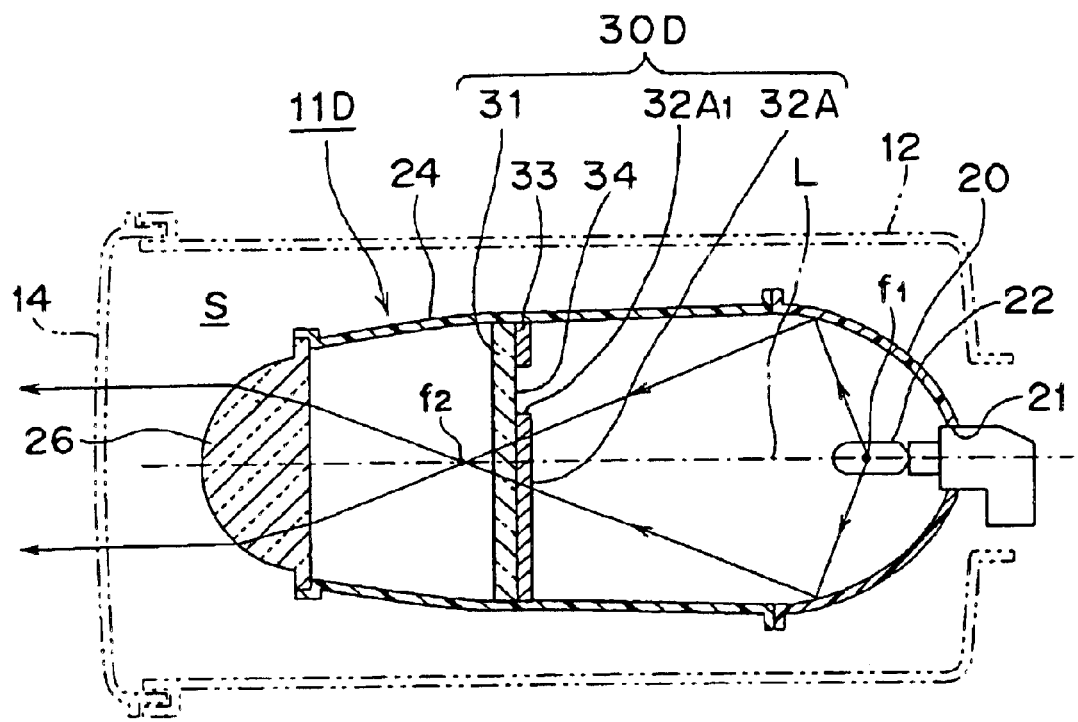
FIG. 9 is a longitudinal sectional view of a projection-type headlamp serving also as an infrared light-emitting lamp constructed in accordance with a fourth embodiment of the present invention.
Figure 10:
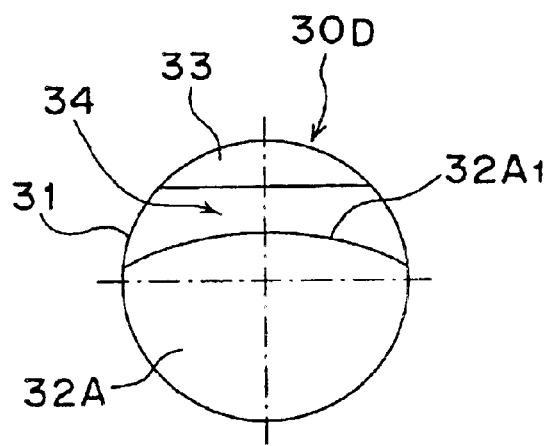
FIG. 10 is a rear view of an infrared light-transmitting filter included in a shade constituting as a principal component of the headlamp of FIG. 9.
Figure 11:
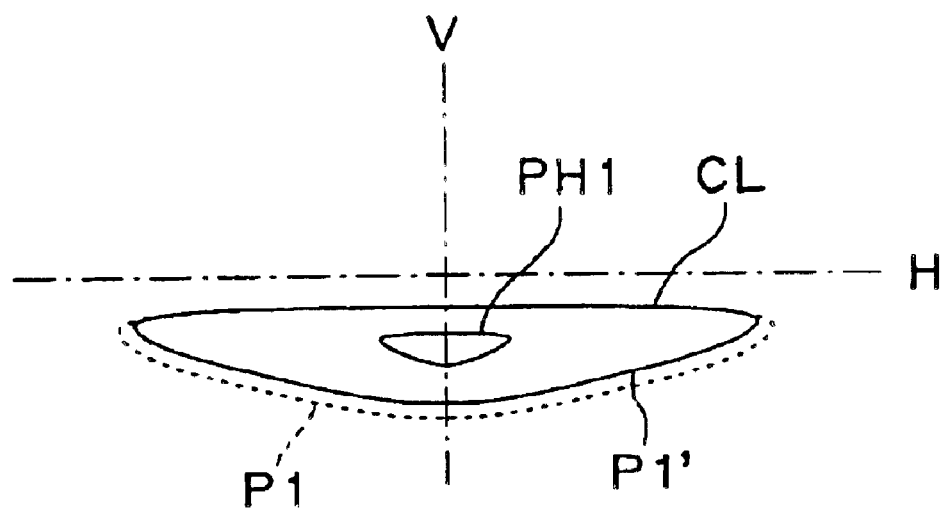
FIG. 11 shows a light distribution pattern of the headlamp of FIG. 9.

FIGS. 9 to 11 show a projection-type headlamp serving also as an infrared light-emitting lamp of a fourth embodiment of the present invention, FIG. 9 is a longitudinal sectional view of the headlamp, FIG. 10 is a rear view of an infrared light-transmitting filter forming a principal component of the shade of the lamp, and FIG. 11 is a diagram showing a visible light beam pattern of the headlamp.

In the projection lamp unit 11D serving also as an infrared light-emitting lamp of the fourth embodiment, above an infrared light transmitting film 32A, which acts as a first portion of the main body of the shade of the lamp and which is disposed on the infrared light-transmitting filter 30D, there is disposed an infrared light transmitting film 33 which acts as a second portion of the main body of the shade. The two infrared light transmitting films 32A and 33 shield visible light except in a film-free region 34. As a result, in forming the visible light beam pattern, the lower side edge portion of the visible light beam pattern P1 formed on a light distribution screen is narrowed.

That is, the infrared light transmitting film 32A formed on the glass plate 31 is the same as in the first embodiment, and further the second infrared light transmitting film 33 for reflecting visible light component and letting infrared light pass is formed apart from and above the infrared light transmitting film 32A. Accordingly, the visible light beam pattern P1' on the light distribution screen formed by the infrared light transmitting film-free region 34 has a band shape defined by cutting off the lower side edge of the visible light beam pattern P1 formed by the lamp unit 11A in the first embodiment (see the dotted line in FIG. 11). It is noted that the cut line CL of the visible light beam P1' is beneath the horizontal line H on the light distribution screen (the hot zone PH1 is beneath the horizontal line H and on the vertical line V), and the hot zone PH2 of the infrared light beam pattern P2 (not shown in FIG. 11) is aligned with the intersection of the vertical line V and the horizontal line H on the light distribution screen, the same as in the case of the lamp unit 11A of the first embodiment (see FIG. 4).

Additionally, the visible light CCD camera CA used in the nighttime forward view detecting system includes an automatic gain control function for adjusting the video output automatically to an optimum value so as not to be too high or too low by measuring the luminance of the view ahead of the camera and adjusting the gain or the like of the photodetector of the camera depending on the luminance. However, this automatic gain control function tends to reduce the gain of the photodetector or the like of the camera excessively due to strong effects of the light intensity in the illuminated area near the vehicle where the solid angle is large, and therefore the imaging performance is reduced in remote areas where the solid angle is small, as a result of which the image of the remote area displayed on the heads-up display (HUD) 9 of the monitor may be unclear. However, in this embodiment, because of the blocking of the portion of the visible light that would otherwise be emitted to the area near the vehicle due to the shielding by the infrared light transmitting film 33 acting as the second shade main body, the visible light intensity in the illuminated area near the vehicle having which could have adverse effects on the automatic gain control function is reduced, alleviating the excessive control tendency of the automatic gain control section of the visible light CCD camera CA, and thereby improving the imaging performance in remote areas where the solid angle is small. On the other hand, since the infrared light is not shielded by the infrared light transmitting film 33 and the infrared light intensity in the infrared light irradiation area is not reduced, the imaging performance of the infrared light CCD camera CB is not adversely affected. Therefore, images of the visible light CCD camera CA and infrared light noctovision CCD camera CB can be properly composed, and the heads-up display (HUD) 9 displays an image of the viewing field ahead of the vehicle which is excellent in visibility even in the remote areas.

If the second shade main body 33 is made of, for example, a metal material so as to shield both visible light and infrared light, although the infrared light intensity on the illuminated area near the vehicle is reduced, the excessive controlling tendency of gain by the automatic gain control section of the visible light CCD camera CA is still alleviated, and the imaging performance in remote areas where the solid angle is small is improved, and therefore a sharp image is obtained on the screen of the heads-up display 9 in essentially the same way.

Figure 12:
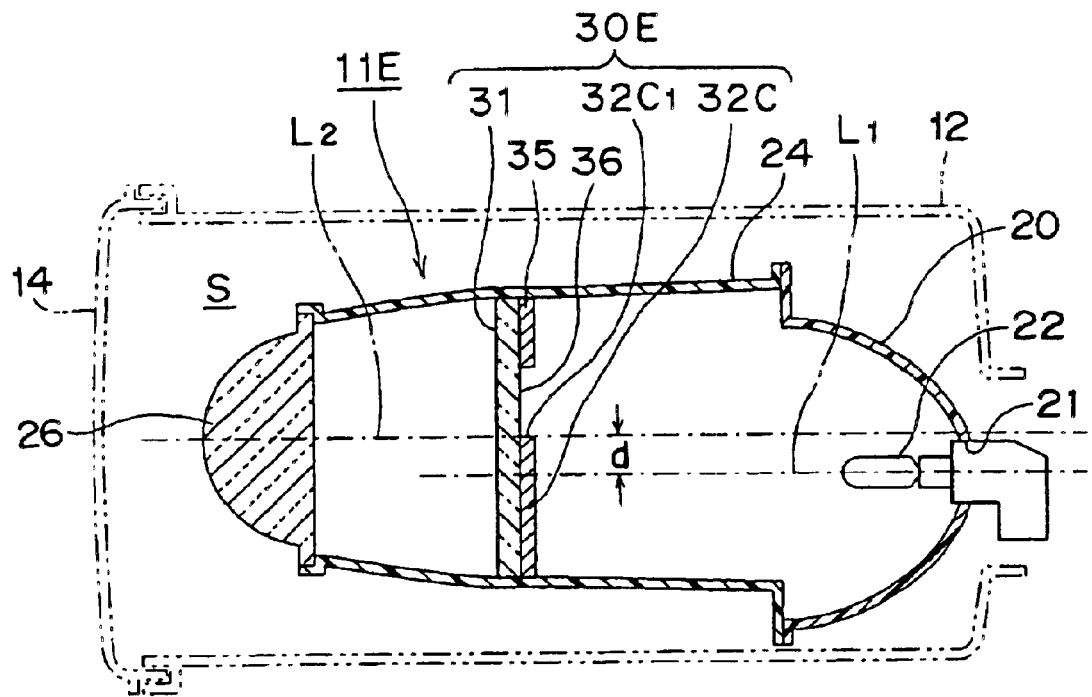
FIG. 12 is a longitudinal sectional view of a projection-type headlamp serving also as an infrared light-emitting lamp constructed in accordance with a fifth embodiment of the present invention.
Figure 13:
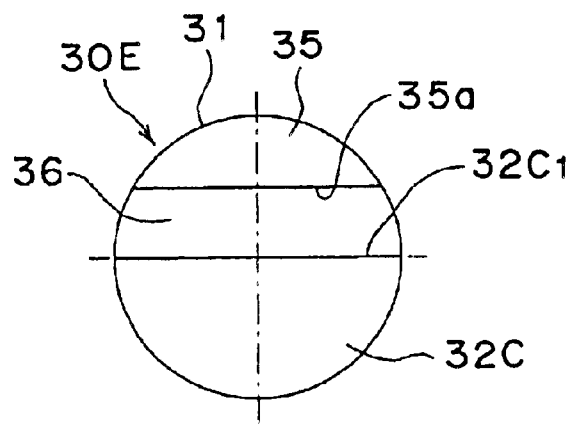
FIG. 13 is a rear view of an infrared light-transmitting filter used in a shade constituting a principal component of the headlamp of FIG. 12.
Figure 14:
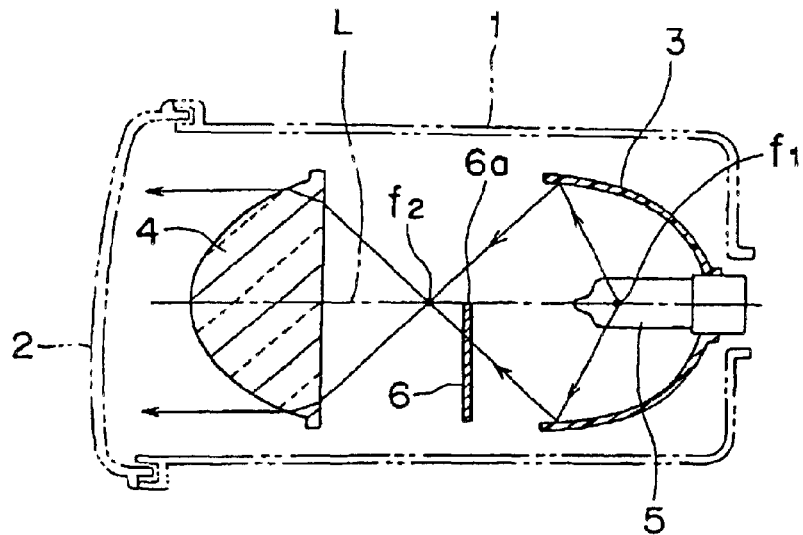
FIG. 14 is a longitudinal sectional view of a conventional projection-type headlamp serving also as an infrared light-emitting lamp.
Figure 15:
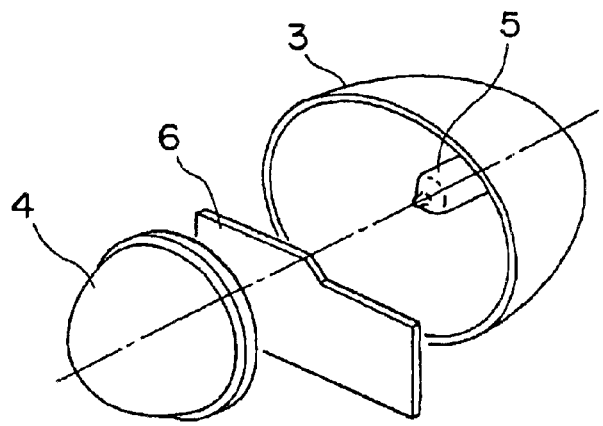
FIG. 15 is a perspective view of the conventional projection-type headlamp serving also as an infrared light-emitting lamp of FIG. 14.
Figure 16:
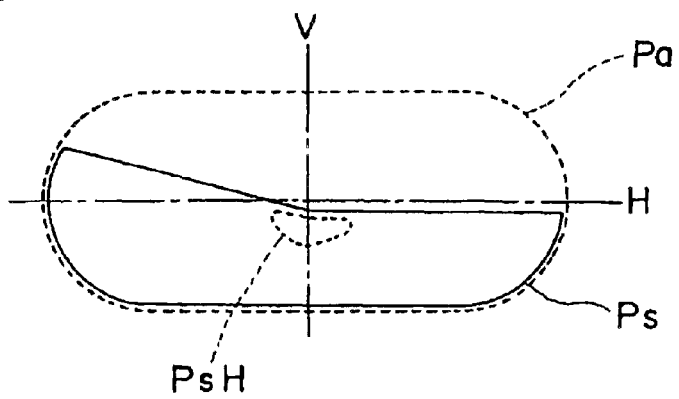
FIG. 16 shows a light distribution pattern produced by the headlamp of FIG. 14.

FIGS. 12 to 13 show a projection-type headlamp serving also as an infrared light-emitting lamp of a fifth embodiment of the present invention, FIG. 12 is a longitudinal sectional view of the headlamp, and FIG. 13 is a rear view of an infrared light-transmitting filter forming a principal component of the shade of the headlamp.

In the projection lamp unit 11E serving also as an infrared light-emitting lamp of the fifth embodiment, the same as in the lamp unit 11C of the third embodiment described above, the upper edge portion 32C1 of the infrared light transmitting film 32C is formed linearly, extending laterally to intersect at a right angle with the optical axis L2 of the projection lens 26, and the lens holder 24 and reflector 20 are disposed so that the optical axis L1 of the reflector 20 is offset by a distance d beneath the optical axis L2 of the projection lens 26, coinciding with the upper edge portion 32C1 of the infrared light transmitting film 32C. In the infrared light-transmitting filter 30E, an infrared light transmitting film 35 is formed as a second shade main body, spaced by a specific distance above the infrared light transmitting film 32C acting as the first shade main body. Reference numeral 36 denotes an infrared light transmitting film-free region.

Therefore, also in this embodiment, the same visible light beam pattern as the visible light beam pattern P1' formed by the lamp unit 11D of the fourth embodiment is obtained and the excessive gain controlling tendency by the automatic gain control section of the visible light CCD camera is ameliorated, while the imaging performance in remote areas where the solid angle is small is improved, and therefore a sharp image is obtained on the screen of the heads-up display 9.

The film thickness of the upper side edge portion 32C1 of the infrared light transmitting film 32C and the lower side edge portion 35a of the infrared light transmitting film 35 become thinner going toward the edge of the film, thereby increasing the visible light transmission efficiency.

Accordingly, problems such as excessive contrast near the cut line of the visible light beam (the contrast at the cut line border is too sharp) or difficulty in viewing due to sharp stripes of high contrast on the road surface near the vehicle are alleviated, so that the visibility is improved for the driver.

As for gradually changing the visible light transmission efficiency of the upper side edge portion 32C1 of the infrared light transmitting film 32C and the lower side edge portion 33a of the infrared light transmitting film 33, instead of the above-mentioned approach of adjusting the film thickness, the density of fine through-holes formed along the edge portion of the infrared light transmitting film may be increased approaching the edge portion, or fine undulations may be continuously formed in the edge portion of the infrared light transmitting film.

In the first to fifth embodiments described above, a projection-type headlamp serving also as an infrared light-emitting lamp and embodied in the form of a fog lamp has been explained. However, the present invention may be also applied to a projection-type low-beam headlamp serving also as an infrared light-emitting lamp in a headlamp for forming a low beam, and in this case also the cut line and hot zone of the visible light beam pattern (low beam pattern) are located beneath the horizontal line H on the light distribution screen. It is further preferred to adjust the hot zone to be beneath the horizontal line H by about 0.6 degrees.

As clear from the description herein, since the visible light beam produced by the lamp of the invention does not cause glare for vehicles in the adjacent lane and the imaging performance of the infrared noctovision camera for remote areas is improved, it can be appreciated that the visibility ahead of the vehicle, as enhanced by the image sensed by the infrared noctovision camera and displayed on the monitor screen, is improved without disturbing the vision of drivers of vehicles in the adjacent lane, so that the overall driving safety is enhanced.

In the case where the cut line of visible light beam pattern is substantially straight in the lateral direction, the lateral visibility of the visible light beam irradiation area is further improved.

Moreover, although visibility is slightly sacrificed near the vehicle by the visible light beam in some cases, the visibility ahead of the vehicle in the image from the infrared noctovision camera displayed on the monitor screen, especially in remote areas, is further improved, so that driving safety is further enhanced.

Still further, the cut line (bright-dark border) of the visible light beam is not too sharp, which also adds to the improvement in visibility for the driver.

It should further be apparent to those skilled in the art that various changes in form and detail of the invention as shown and described above may be made. It is intended that such changes be included within the spirit and scope of the claims appended hereto.

What is claimed is:

1. A projection-type headlamp serving also as an infrared light-emitting lamp comprising: an ellipsoidal reflector, a light source disposed at a first focal point of said reflector, a projection lens disposed forward of said reflector, and a shade disposed near a second focal point of said reflector for shielding visible light and passing infrared light for simultaneously forming a predetermined visible light beam pattern having a cut line and a predetermined infrared light beam pattern, an upper edge portion of said shade being positioned above an optical axis of said reflector.

2. The projection-type headlamp serving also as an infrared light-emitting lamp of claim 1, wherein said upper edge portion of said shade is positioned such that a visible light beam pattern produced by said headlamp on a screen positioned in front of said headlamp has a hot zone positioned approximately 1.0 degree below a horizontal line about which an infrared light beam pattern produced by said headlamp is centered.

3. The projection-type headlamp serving also as an infrared light-emitting lamp of claim 1, wherein said shade comprises a circular glass plate and an infrared light transmitting and visible light blocking film disposed on said circular glass plate, covering a lower portion of said circular glass plate and having said upper edge portion extending above said optical axis of said reflector.

4. The projection-type headlamp serving also as an infrared light-emitting lamp of claim 1, wherein said shade comprises a substantially semicircular glass plate and an infrared light transmitting and visible light blocking film disposed on and substantially covering said substantially semicircular glass plate.

5. The projection-type headlamp serving also as an infrared light-emitting lamp according to claim 1, wherein said upper edge portion of said shade has a convex shape curved upward.

6. The projection-type headlamp serving also as an infrared light-emitting lamp according to claim 5, wherein said convex shape is determined to compensate for an aberration characteristic of said projection lens such that a cut light of a visible beam pattern produced by said headlamp is substantially straight.

7. The projection-type headlamp serving also as an infrared light-emitting lamp according to claim 1, further comprising a second shade for shielding visible light disposed above said first-mentioned shade.

8. The projection-type headlamp serving also as an infrared light-emitting lamp according to claim 7, wherein said second shade is made of metal and shields both visible and infrared light.

9. The projection-type headlamp serving also as an infrared light-emitting lamp according to claim 3, further comprising a second shade for shielding visible light disposed above said first-mentioned shade, said second shade comprising a second infrared light transmitting and visible light blocking film disposed on said circular glass plate.

10. The projection-type headlamp serving also as an infrared light-emitting lamp according to claim 1, further comprising means for adjusting a visible light transmission efficiency of said shade near said upper edge portion of said shade whereby said visible light transmission efficiency increases closer to lateral portions of said upper edge portion.

11. The projection-type headlamp serving also as an infrared light-emitting lamp according to claim 3, wherein a thickness of said film is thinner in lateral edge portions than in center portions, whereby a visible light transmission efficiency increases closer to lateral portions of said upper edge portion.

12. A projection-type headlamp serving also as an infrared light-emitting lamp comprising: an ellipsoidal reflector, a light source disposed at a first focal point of said reflector, a projection lens disposed forward of said reflector, and a shade for shielding visible light and passing infrared light for simultaneously forming a predetermined visible light beam pattern having a cut line and a predetermined infrared light beam pattern, wherein said shade comprises an infrared light transmitting and visible light blocking film, said shade being disposed at a focal point of said projection lens with an upper edge portion of said infrared light transmitting and visible light blocking film being aligned with an optical axis of said projection lens, and an optical axis of said reflector being offset below said optical axis of said projection lens such that an upper edge portion of said shade is positioned above said optical axis of said reflector.

13. The projection-type headlamp serving also as an infrared light-emitting lamp of claim 12, wherein said shade further comprises a circular glass plate, and said infrared light transmitting and visible light blocking film is disposed on said circular glass plate, covering a lower portion of said circular glass plate and having said upper edge portion extending above said optical axis of said reflector.

14. The projection-type headlamp serving also as an infrared light-emitting lamp of claim 12, wherein said shade further comprises a substantially semicircular glass plate, and said infrared light transmitting and visible light blocking film is disposed on and substantially covering said substantially semicircular glass plate.

15. The projection-type headlamp serving also as an infrared light-emitting lamp according to claim 12, wherein said upper edge portion of said shade has a convex shape curved upward.

16. The projection-type headlamp serving also as an infrared light-emitting lamp according to claim 15, wherein said convex shape is determined to compensate for an aberration characteristic of said projection lens such that a cut light of a visible beam pattern produced by said headlamp is substantially straight.

17. The projection-type headlamp serving also as an infrared light-emitting lamp according to claim 12, further comprising a second shade for shielding visible light disposed above said first-mentioned shade.

18. The projection-type headlamp serving also as an infrared light-emitting lamp according to claim 17, wherein said second shade is made of metal and shields both visible and infrared light.

19. The projection-type headlamp serving also as an infrared light-emitting lamp according to claim 13, further comprising a second shade for shielding visible light disposed above said first-mentioned shade, said second shade comprising a second infrared light transmitting and visible light blocking film disposed on said circular glass plate.

20. The projection-type headlamp serving also as an infrared light-emitting lamp according to claim 12, further comprising means for adjusting a visible light transmission efficiency near said upper edge portion of said shade whereby said visible light transmission efficiency increases closer to lateral portions of said upper edge portion.

\* \* \* \* \*